United States Patent Office 3,104,268
Patented Sept. 17, 1963

3,104,268
ALKYLATION OF AROMATICS WITH A ZINC OXIDE, CHROMIUM OXIDE, COPPER OXIDE, SILICA-ALUMINA CATALYST
Stephen M. Kovach, Highland, Ind., assignor to Sinclair Research, Inc., Wilmington, Del., a corporation of Delaware
No Drawing. Filed Mar. 19, 1962, Ser. No. 180,820
13 Claims. (Cl. 260—671)

This invention relates to the alkylation of aromatics with alkylating agents and is particularly concerned with the alkylation of aromatics with alkylating agents conducted in the presence of an alkylation catalyst consisting essentially of the oxides of zinc and chromium or zinc, copper and chromium on a silica-alumina catalytic support.

Alkylated aromatics are of value in many fields and some are particularly desirable as constituents of high octane aviation fuels and as sources of synthetic detergents. Although catalytic processes for the alkylation of aromatics with alkylating agents have been suggested in the past, the present process provides good utilization of the alkylating agents, low conversions of the alkylating agent to paraffin by hydrogenation, low carbon yields thus negligible carbon laydown on the catalyst resulting in a longer cycle time before regeneration, good catalyst aging characteristics, low disproportionation or isomerization and a readily regenerable catalyst.

The alkylation is accomplished in the present process by employing a particularly effective catalyst which includes chromia in catalytic amounts generally from about 1 to 39, preferably from about 5 to 20 weight percent, zinc oxide in catalytic amounts generally from about 1 to 39, preferably from about 5 to 20 weight percent and copper oxide in catalytic amounts generally from about 0 to 38, preferably from about 0 to 20 weight percent on a silica-alumina base. The concentration of the active metal oxides is preferably from about 5 to 40 weight percent of the catalyst. The ratio of components, zinc to chromium or zinc to copper to chromium, is not critical but preferably a predominance of the zinc component is desired, such as for example, mole ratios of zinc to chromium ranging from about 1:1 to about 8:1, preferably a mole ratio of zinc to chromium of about 2:1; and mole ratios of zinc to copper to chromium ranging from about 1:1:1 to about 8:1:1, preferably a mole ratio of zinc to copper to chromium of about 2:1:1. The catalyst base is silica-alumina and generally includes a minor amount of alumina, for instance about 1 to 40, preferably about 10 to 25 weight percent alumina based on the silica. Other silica containing materials, e.g. silica-magnesia, silica-alumina-magnesia, silica-zirconia, silica-alumina-zirconia, etc. may be used. Catalysts of very low silica content may also be utilized, for instance the so-called Uvergel alumina catalysts which usually contain less than about 10 weight percent silica. The base can include minor amounts, for instance, from about 1 to 20 weight percent, of other ingredients such as promoters, particularly acidic promoters. Thus, the catalyst base can contain halogen, e.g., chlorine or fluorine, usually in amounts of from about 0.1 to 3 percent by weight, or it can be composed of mixtures of silica-alumina with or without promoters, for example, metal oxides such as magnesia and boria, the total amount of such promoters generally not exceeding about 10 percent by weight, for instance about 0.1 to 5 weight percent. The preferred silica-alumina is synthetic gel silica-alumina and contains at least about 50% silica and usually at least about 50 to 90% silica based on the weight of the catalyst.

The catalyst used in the process of the present invention can be prepared by known procedures involving impregnating the support, for instance silica-alumina, with water soluble salts of the catalytic components or by co-precipitation. The support can be impregnated with the active oxides simultaneously or singly in any order. The metal oxides can be added to the catalyst in any stage of its preparation. They may be incorporated in the support either before or after the addition of the zinc oxide. They can be added to the catalyst after the support has been formed by tableting or extrusion and calcined. Suitable water-soluble chromium compounds include chromium nitrate, chromic acid, chromic sulfate and chromium chloride. Suitable water-soluble zinc compounds include zinc acetate, zinc bromate, zinc bromide, zinc chlorate, zinc chloride, zinc dichromate, zinc fluogallate, zinc iodide, zinc nitrate, zinc picrate and zinc sulfate. Suitable water-soluble copper salts include cupric acetate, cupric bromate, cupric bromide, cupric chlorate, cupric chloride, cupric dichromate, cupric lactate, cupric nitrate, cupric salicylate and cupric sulfate.

When employing the impregnation procedure, after impregnation, the resulting impregnated product is dried generally at a temperature within the range of about 170° to 400° F. for at least about 6 hours and up to 24 hours or more with a slow stream of air circulated to carry off the water vapor. The dried silica-alumina catalyst mixture then may be formed by a tableting or extruding operation. If the catalyst is to be in finely divided form, a grinding operation may follow drying. In case of tableting it is customary to incorporate a die lubricant which advantageously is organic and can be burned out by oxidation in the calcination step. The dried pellets are suitable for subjection to high temperature treatment or calcination at a temperature between about 500° F. and about 1500° F., and about 700° F. and 1000° F., for instance for a period of between about 2 and about 36 hours. It is generally preferred that the calcining operation be conducted in a manner minimizing contact time of the silica-alumina containing product with water vapor at the high temperature encountered.

The product after drying generally contains a substantial amount of water which is driven off at a temperature above about 400° F. It is usually preferred to heat the silica-alumina containing composite at a rate of 2 to 20° F. per minute up to about 600° F. with an air flow through the catalyst bed followed by heating at a slower rate to the final calcination temperature within the range of about 700° F. to 1500° F., especially if an organic die lubricant is to be oxidized without localized overheating. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The silica-alumina impregnated with the catalytically active components, is finally cooled to yield the finished product.

The catalyst employed in the process of the present invention can be easily regenerated employing conventional procedures, for instance by subjecting it to an oxygen-containing gas at temperatures sufficient to burn off carbon deposited on the catalyst during alkylation. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The aromatics, e.g. alkylatable aromatic hydrocarbons, suitable for alkylation in the present process include mono- and polycyclic aromatic hydrocarbon compounds such as benzene and its lower alkyl homologues e.g. toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

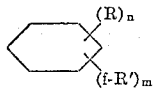

where R is an alkyl, including cyclo alkyl, radical containing generally from about 1 to 20, preferably from about 1 to 8, carbon atoms; $n$ is 0 to 5, preferably 1 to 3; R' is an aromatic hydrocarbon ring, preferably $C_4H_4$; -f- indicates a fused ring relationship (two carbon atoms common to the aromatic nuclei e.g. as in naphthalene); and $m$ is generally 0 to 1 or more. R may also be a divalent hydrocarbon group attached to the aromatic ring at two carbon atoms of the ring, e.g. alkylene, as in decalin and tetralin. The preferred aromatics, however, include benzene and alkyl benzenes corresponding to the above formula when $m$ is 0.

The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyltoluene, meta-ethyltoluene, para-ethyltoluene, 1,2,3-trimethyl benzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable hydrocarbons containing condensed benzene rings include naphthalene, alpha-methylnaphthalene, beta-methylnaphthalene, anthracene, phenanthrene, naphthacene, rubrene, indane, etc. The above alkylatable aromatics can be used alone or in mixtures.

The alkylating agents suitable for use in the present process include organic compounds containing an alkyl, including cycloalkyl, radical which is transferable to the aromatic nucleus. These compounds are aliphatic and include alkyl halides, alkanols, ethers, and olefins generally containing from about 1 to 20 carbon atoms, preferably from about 1 to 8 carbon atoms.

A number of suitable alkylating agents correspond to the general formula

R—O—R' where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. Specific alkylating agents include alkanols such as ethanol, propanol, iso-propanol, pentanol, octanol and preferably methanol and alkyl ethers such as dimethyl ether, diethyl ether and like members whether substituted with non-interfering groups or not. When the alkanols are employed, they may go through an intermediate ether stage.

Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

Suitable olefins as alkylating agents which may be charged in the process of this invention include unsaturated hydrocarbons such as monoolefins, diolefins, polyolefins and acetylenic hydrocarbons. Monoolefins which may be utilized in the process of the present invention are either normally gaseous or normally liquid and include ethylene, propylene, 1-butene, 2-butene, isobutylene, and higher molecular weight normally liquid olefins such as the various pentenes, hexenes, heptenes, octenes and still higher molecular weight liquid olefins the latter including various olefin polymers having from about 6 to about 18 carbon atoms per molecule such as propylene dimer, propylene trimer, propylene tetramer, propylene pentamer, normal and iso-butylene dimers, butylene trimer and butylene tetramers, etc. Cycloolefins such as cyclopentene, methyl cyclopentene, cyclohexene, methylcyclohexene, etc. may also be utilized. The polyolefinic hydrocarbons utilizable in the process of this invention include conjugated diolefins such as butadiene and isoprene, as well as non-conjugated diolefins and other polyolefinic hydrocarbons containing two or more double bonds per molecule. Acetylene and homologs thereof are also useful olefin-acting compounds.

The normally gaseous olefinic hydrocarbons appearing in minor quantities in various refinery gas streams, usually diluted with various unreactive gases such as hydrogen, nitrogen, methane, ethane, propane, etc. can also be used.

A refinery off-gas ethylene stream may contain varying quantities of hydrogen, nitrogen, methane and ethane with the ethylene in minor proportions while a refinery off-gas propylene stream is normally diluted with propane and contains the propylene in minor quantities and a refinery off-gas butene stream is normally diluted with butanes and contains the butenes in minor quantities. Such gas streams containing olefin hydrocarbons in minor or dilute quantities are useful in the process of this invention.

In accordance with this invention the alkylatable aromatic hydrocarbon and the alkylating agent is contacted with the zinc oxide-chromia-silica-alumina catalyst or the zinc oxide-copper oxide-chromia-silica-alumina catalyst at temperatures from about 300 to 1000° F., preferably in the range from about 400 to 800° F. while the pressure may range from about ambient pressure or less up to about 2000 p.s.i.g.; e.g., about 0 to 2000 p.s.i.g., and are preferably elevated pressures ranging from about 0 to 1000 p.s.i.g. The catalyst can be used as a fixed, moving or fluidized bed or in any other convenient type of handling system. The aromatic space velocity will in most cases be from about 0.01 to 20, and preferably about 0.1 to 10, weights of aromatic per weight of catalyst per hour (WHSV). The alkylating agent is generally employed in a molar ratio to the aromatic of about 0.1 to 2:1 and preferably of about 0.1 to 1:1. Diluent gases, e.g., inert or hydrocarbon, such as $N_2$, $H_2$ and $CH_4$ can also be utilized in the present process usually in the amount ranging from a diluent gas to aromatic molar ratio of about 1 to 20:1 or more, preferably from about 1 to 10:1. Hydrogen is the especially preferred diluent.

The following examples will serve to illustrate the invention but they are not to be considered as limiting.

The alkylation runs are performed in a 1-inch internal diameter universal stainless steel reactor heated by a bronze-block furnace. The temperature of the reactor is controlled by Fenwall thermostats and the temperature of the catalyst bed is measured by means of iron-constantan thermocouples located throughout the bed.

EXAMPLES I–III 3 moles of toluene and 1 mole of propylene are charged to the reactor containing a zinc oxide-chromia-silica-alumina catalyst from a stainless steel bomb by nitrogen displacement. Both the liquid feed and diluent gas are metered to the reactor through Fischer-Porter rotameters.

The liquid products are separated from the effluent gases in a Jerguson liquid-level gauge and then released to atmospheric pressure at room temperautre. The volume of dry gas is measured by means of a wet test meter to atmospheric pressure at room temperature. The volume and spot and continuous gas samples are taken. The gas samples are analyzed by mass spectrometer techniques. Total hydrocarbon analyses are by vapor phase chromatography. The example is conducted under the conditions specified in Table I.

*Table I*

| Examples | I | II | III |
|---|---|---|---|
| Catalyst | 10% ZnO-5% $Cr_2O_3$/$SiO$-$Al_2O_3$ | | |
| Conditions: | | | |
| Temperature, °F | 550 | 600 | 550 |
| Pressure, p.s.i.g | 150 | 200 | 150 |
| WHSV | 0.25 | 0.25 | 0.25 |
| $H_2$/arom | 2/1 | 2/1 | 2/1 |
| Arom/$C_3^=$ | 2/1 | 2/1 | 4.8/1 |
| $C_3$/$C_3^=$ | | | 4/1 |
| Aromatic | Benzene | Benzene | Benzene |
| Mole percent $C_3^=$ utilized: | | | |
| Alkylation | 63 | 36 | 80 |
| Polymerization | 20 | | 5 |
| Hydrogenation | 9 | 60 | 9 |
| Carbon on catalyst, weight percent | Nil | 0.09 | Nil |

By varying the reaction conditions, as indicated in Example II in Table I, propylene utilization decreased. In Example III, propylene utilization was increased by increasing the mole ratio of aromatic to olefin. Therefore, when alkylating an alkylatable aromatic with an olefin, it is preferable to conduct the alkylation reaction at a temperature less than about 575° F. and a mole ratio of aromatic to olefin of about 3:1 to 5:1. However, with higher mole ratios of aromatic to olefin, the alkylation temperature can be increased without increasing hydrogenation, especially when the alkylatable aromatic is substituted, such as for instance toluene.

EXAMPLES IV–VII

A second series of runs are conducted in which various catalysts are compared to a zinc oxide-copper oxide-chromia-silica-alumina catalyst in regard to their alkylating agent utilization and coking rate. The alkylating agent used is methanol and the alkylatable aromatic is ortho-xylene. The examples are conducted under the conditions specified in Table II.

*Table II*

| Example | IV | V | VI | VII |
|---|---|---|---|---|
| Catalyst | $SiO_2$-$Al_2O_3$ (88% silica) (12% alumina) | 32% $Cr_2O_3$ on $SiO_2$-$Al_2O_3$ | 10% ZnO-5% CuO-5% $Cr_2O_3$ on $SiO_2$-$Al_2O_3$ | |
| Conditions: | | | | |
| Temperature, °F | 700 | 700 | 700 | 700 |
| Pressure, p.s.i.g | 100 | 100 | 200 | 500 |
| WHSV | 0.25 | 0.25 | 0.25 | 0.38 |
| Aromatic/methanol | 2/1 | 1/1 | 1/1 | 1/1 |
| Diluent | None | None | $H_2$-3/1 | $H_2$-7/1 |
| Methanol utilization | 44 | 45 | 51 | 57 |
| Carbon on catalyst, weight percent | 2.7 | 1.2 | 1.0 | 0.02 |
| Cycle life, hours | 6 | 24 | 24 | >200 |

When the aromatic and methanol are processed over a conventional silica-alumina catalyst under methylation conditions, a high methanol utilization is obtained, but there is also a high coking rate. This necessitates frequent regeneration. By activating the silica-alumina with a high percentage of chromia (Example V) high methanol utilization is maintained and coking is decreased extending the cycle life of the catalyst. Using hydrogen as a diluent (Example VI) decreases the coke on the catalyst slightly and increases methanol utilization. When a zinc oxide-copper oxide-chromia-silica-alumina catalyst is used in the presence of hydrogen as a diluent, quite high utilization of methanol is obtained and the coking on the catalyst is greatly decreased resulting in an extended cycle life between regenerations.

The use of hydrogen as a diluent in the presence of a zinc oxide-copper oxide-chromia-silica-alumina catalyst is important for high utilization and low carbon laydown on the catalyst. Table III illustrates the effect of hydrogen on this catalyst.

*Table III*

[Catalyst: 10% ZnO—5% CuO—5% $Cr_2O_3$ on $SiO$—$Al_2O_3$. Standard conditions: 800° F.; atm. pressure, 0.37 WHSV; methanol/O-xylene 1/1]

| Example | VIII | IX |
|---|---|---|
| $H_2$/aromatic | None | 4/1 |
| Methanol utilization | 31 | 30 |
| Carbon on catalyst (weight percent feed) | 3.5 | 1.4 |

It is claimed:

1. A process for the alkylation of aromatics with an alkylating agent which comprises contacting an alkylatable aromatic with an alkylating agent under alkylation conditions including a temperature of about 300 to 1000° F. and in the presence of free hydrogen and of a catalyst consisting essentially of about 1 to 39 weight percent zinc oxide, about 1 to 39 weight percent chromium oxide and about 0 to 38 weight percent copper oxide and a silica-almina support, wherein the total amount to said zinc oxide, chromium oxide and copper oxide is present in the range from about 5 to 40 weight percent of the total catalyst.

2. The process of claim 1 wherein the silica-alumina is a synthetic gel silica-alumina.

3. The process of claim 1 wherein the alkylatable aromatic hydrocarbon corresponds to the general structural formula:

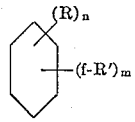

where R is an alkyl radical containing from 1 to 18 carbon atoms; $n$ is 0 to 5; R' is an aromatic hydrocarbon ring; $m$ is 0 to 1 and -f- indicates a fused ring relationship.

4. The process of claim 1 wherein the alkylating agent is a monoolefin of from 2 to 12 carbon atoms.

5. The process of claim 4 wherein the olefinic alkylating agent comprises propylene.

6. The process of claim 1 wherein the alkylating agent is an alkanol of 1 to 4 carbon atoms.

7. The process of claim 6 wherein the alkanol is methanol.

8. A process for the alkylation of aromatics with an olefinic alkylating agent which comprises contacting an alkylatable aromatic hydrocarbon corresponding to the general formula:

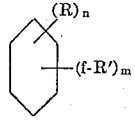

where R is an alkyl radical containing from 1 to 18 carbon atoms; $n$ is 0 to 5; R' is an aromatic hydrocarbon ring; $m$ is 0 to 1 and -f- indicates a fused ring relationship, with a monoolefinic alkylating agent containing 2 to 12 carbon atoms under alkylation conditions, including a temperature of about 400 to 800° F. and in the presence of free hydrogen a catalyst consisting essentially of about 5 to 20 weight percent zinc oxide and about 5 to 20 weight percent chromia on a silica-alumina support.

9. The process of claim 8 wherein the hydrogen is present in a molar ratio of hydrogen to aromatic of about 1 to 20:1.

10. The process of claim 8 wherein the alkylating temperature is less than about 575° F. and the molar radio of aromatic to alkylating agent is in the range from about 3:1 to 5:1.

11. A process for the alkylation of aromatics with an alkylating agent which comprises contacting an alkylatable aromatic hydrocarbon corresponding to the general formula:

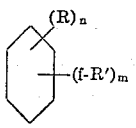

where R is an alkyl radical containing from 1 to 18 carbon atoms; $n$ is 0 to 5; R′ is an aromatic hydrocarbon ring; $m$ is 0 to 1 and -f- indicates a fused ring relationship with an alkanol alkylating agent from 1 to 4 carbon atoms under alkylation conditions, including a temperature of from 400 to 800° F. and in the presence of free hydrogen and of a catalyst consisting essentially of about 5 to 20 weight percent zinc oxide, about 5 to 20 weight percent chromium oxide and about 0 to 20 weight percent copper oxide on a silica-alumina support.

12. The process of claim 11 wherein the hydrogen is present in a molar ratio of hydrogen to aromatic of about 1 to 20:1.

13. The process of claim 11 wherein the total amount of zinc oxide, copper oxide and chromium oxide is in the range of about 5 to 40 weight percent of the catalyst.

References Cited in the file of this patent

UNITED STATES PATENTS

| | | |
|---|---|---|
| 1,809,978 | Larson | June 16, 1931 |
| 2,242,488 | Thacker | May 20, 1941 |
| 2,523,686 | Engel | Sept. 26, 1950 |